US008795483B2

(12) United States Patent
Iltšenko et al.

(10) Patent No.: US 8,795,483 B2
(45) Date of Patent: Aug. 5, 2014

(54) TWO-CHAMBER COAXIAL ELECTROLYSER DEVICE

(76) Inventors: Valeri Iltšenko, Tallinn (EE); Nikolay Naida, Tallinn (EE)

( * ) Notice: Subject to any disclaimer, the term of this patent is extended or adjusted under 35 U.S.C. 154(b) by 920 days.

(21) Appl. No.: 12/111,733

(22) Filed: Apr. 29, 2008

(65) Prior Publication Data
US 2008/0264781 A1 Oct. 30, 2008

(30) Foreign Application Priority Data
Apr. 30, 2007 (EE) .................................. 200700021

(51) Int. Cl.
*C25B 9/08* (2006.01)
(52) U.S. Cl.
USPC ....................................................... 204/260
(58) Field of Classification Search
CPC ............... C02F 1/4618; C02F 1/46104; C02F 1/46109; C02F 2001/46171; C02F 2001/46152
USPC ......................................... 204/260, 263, 272
See application file for complete search history.

(56) References Cited

U.S. PATENT DOCUMENTS

| | | | | |
|---|---|---|---|---|
| 4,024,047 A | * | 5/1977 | Clark et al. ................... | 204/671 |
| 4,113,682 A | * | 9/1978 | Nagata et al. ................. | 524/512 |
| 5,595,645 A | * | 1/1997 | Barr .............................. | 205/771 |
| 5,635,040 A | * | 6/1997 | Bakhir et al. ................. | 204/260 |
| 6,033,539 A | * | 3/2000 | Gablenko ..................... | 204/260 |
| 6,416,637 B1 | * | 7/2002 | Gelchinski ................... | 204/263 |
| 7,374,645 B2 | * | 5/2008 | Davis et al. ................... | 204/242 |
| 2005/0183949 A1 | * | 8/2005 | Daly et al. .................... | 204/242 |
| 2006/0249400 A1 | * | 11/2006 | Bremauer ..................... | 205/743 |
| 2006/0269819 A1 | * | 11/2006 | Artibise et al. ................ | 429/35 |

FOREIGN PATENT DOCUMENTS

| | | | | |
|---|---|---|---|---|
| EP | 0922788 A1 | * | 6/1999 | ............... C25B 9/00 |
| RU | 2176989 C1 | | 12/2001 | |
| RU | 2270885 C1 | | 2/2006 | |
| WO | WO-9840536 A1 | | 9/1998 | |
| WO | WO2006/013333 | * | 2/2006 | ............. B01D 46/34 |

OTHER PUBLICATIONS

Estonian Search Report for P20070021 dated Apr. 1, 2008.
English Abstract for RU2176989.
English Abstract for RU2270885.

* cited by examiner

*Primary Examiner* — Nicholas A Smith
*Assistant Examiner* — Ciel Thomas
(74) *Attorney, Agent, or Firm* — Gearhart Law, LLC (57) ABSTRACT

The disclosure relates to an electrochemical treatment of liquids and production of gases. Increased operating efficiency of an electrochemical device is achieved through the combination of measures: (1) sealing of the device on an element-by-element basis; (2) transfer of the liquid and gaseous phase interface into a passive extension of an anode chamber; (3) utilization of a tubular cathode as an inner wall and a cylindrical anode with an external coating as an outer wall; (4) positioning of channels and determining their dimensions so as to maintain helicity of electrolyte movement combined with the increase of the production output; (5) positioning and design of terminals, which provide for the reduction of their heating; and (6) ability of the device to operate under the conditions, when its longitudinal axis deviates from the vertical line by an angle of $\gamma \leq 85°$ and under pumping conditions.

6 Claims, 8 Drawing Sheets

TWO-CHAMBER COAXIAL ELECTROLYSER DEVICE

TECHNICAL FIELD

The disclosure relates to chemical technologies, particularly concerning the issues of electrochemical treatment of liquids and getting of gases that may be used to purify and disinfect water and to produce anolytes and catholytes.

BACKGROUND

This disclosure is used for the synthesis of disinfecting, sterilizing, detergent, extracting, pH- and ORP-correcting solutions; for electrochemical treatment of organic and inorganic liquids; under conditions of stationary, as well as mobile plants.

As regards the technical design and employed components, one solution is an electrochemical processing device described in Russian Federation patent RU 2104961. However, the processing device disclosed therein has a number of shortcomings. For example, the device does not have sufficient:reliability, resulting from the use of multiple-part assembled bushings that are sealed between themselves and with electrodes only by the axial force from torqued clamping nuts. It has limited output due to the use of rod-type electrodes, presence of electric contact on the thread and, especially, necessity to use for the input into the electrode chambers and for the output from the electrodes to the channels, the diameter of which does not exceed the size of clearance between the electrodes and the diaphragm. There is also a difficulty of operation experienced, caused by the requirement to position the device inside the apparatus in such a way that its longitudinal axis is vertical.

DETAILED DESCRIPTION

Overview

Figure 1:
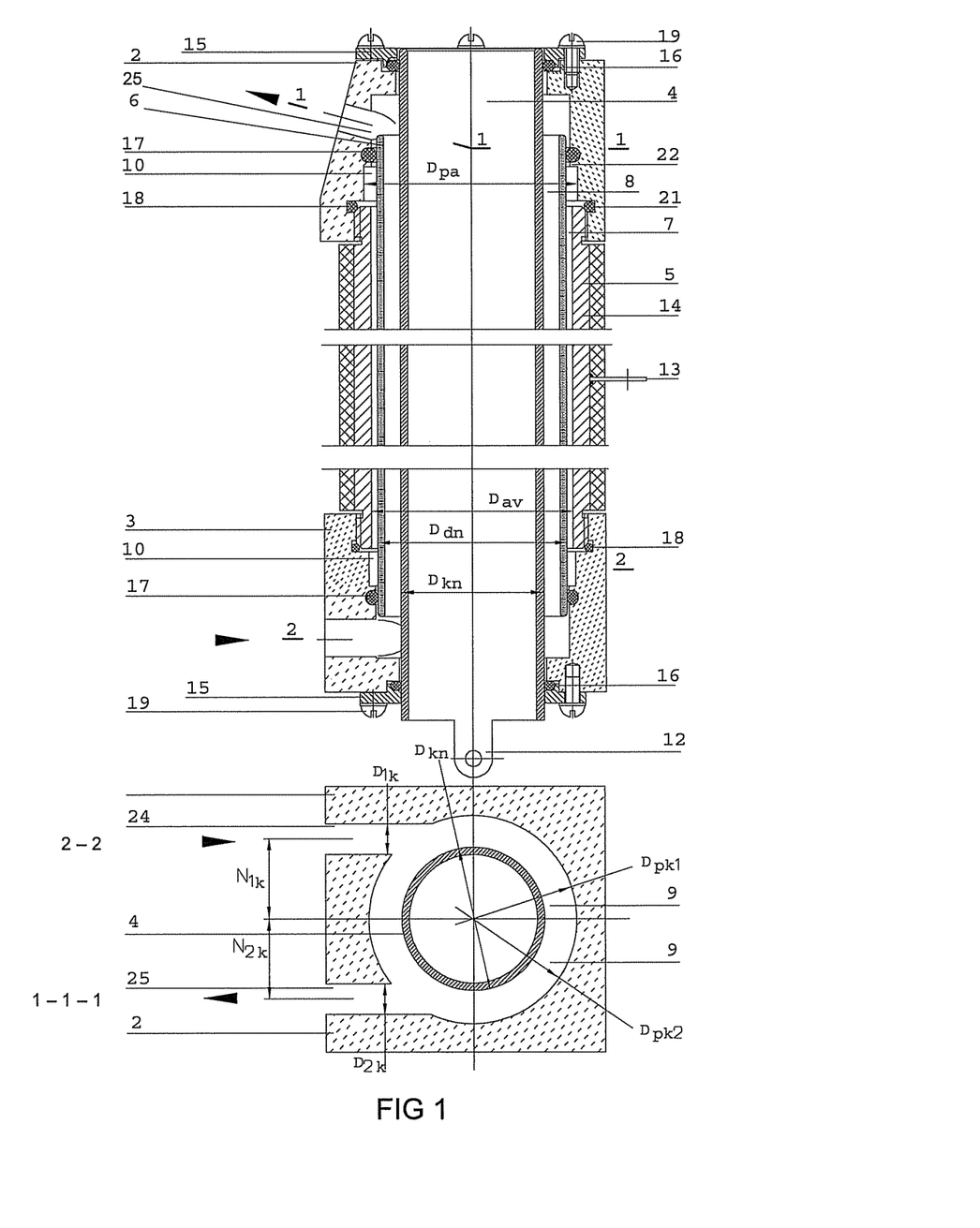
FIG. 1 is a cross-sectional view of a two-chamber coaxial electrolyser device, showing a cathode chamber.
Figure 2:
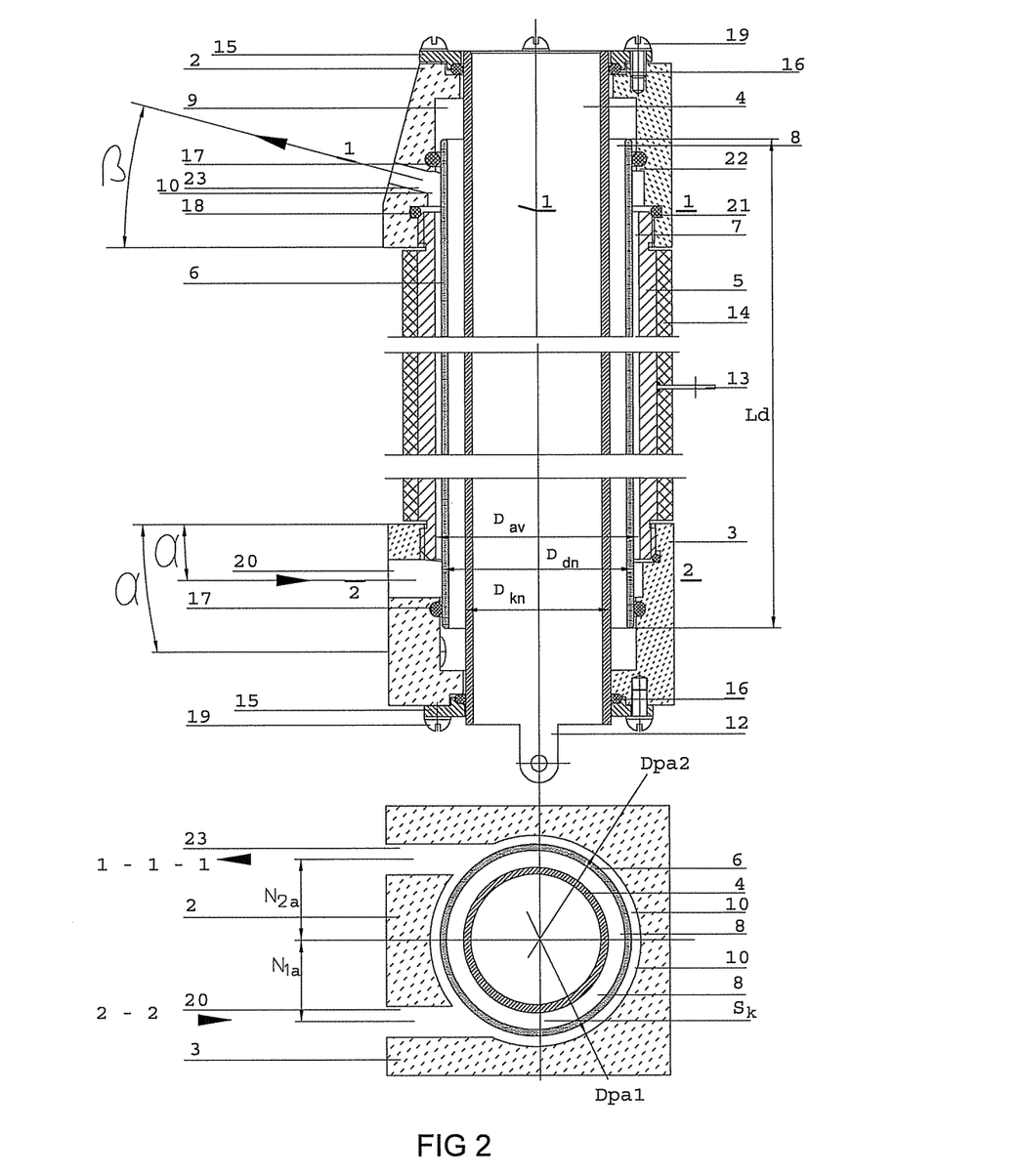
FIG. 2 is a cross-sectional view of an anode chamber of the two-chamber electrolyser device.

The technical result obtained during implementation of the disclosure is improved reliability, performance and applicability of the two-chamber coaxial electrolyser device. To achieve this technical result, the two-chamber electrolyser (FIG. 1 and FIG. 2) is assembled from two tubular electrodes, an outer one serving as an anode 5 and an inner one as the cathode 4. A tubular diaphragm 6 is placed between the two. All three components are positioned coaxially with the use of original monolithic dielectric caps 2 and 3—one of the caps 3 is used for an input of electrolyte and the second one 2 for discharge of electrolysis products. Sealing of the joints anode—cap and anode chamber—cathode chamber is implemented by through standard rubber O-rings 18 and 17. The joint cathode—cap is sealed with the use of a unique flange 15, standard rubber O-ring 16 and standard screws 19. The monolithic cap (FIG. 4) has an internal transverse wall 22, on both sides of which cylindrical extensions 10 and 9 of the anode and diaphragm are arranged. These extensions make both the anode and cathode chambers longer and give an opportunity to introduce electrolyte and draw out electrolysis products with higher efficiency, as now the diameters of the input channels 20 and 24 and output channels 23 and 25 are not restricted by the clearance between the electrode and the diaphragm. The anode and cathode chambers that have been extended this way provide for the possibility of optimal mutual positioning of the input and output channels and in relation to the device's longitudinal axis, taking into account the input of electrolyte and the output of electrolysis products, and also improve the removal of gases from the active zones of electrodes.

Figure 6:
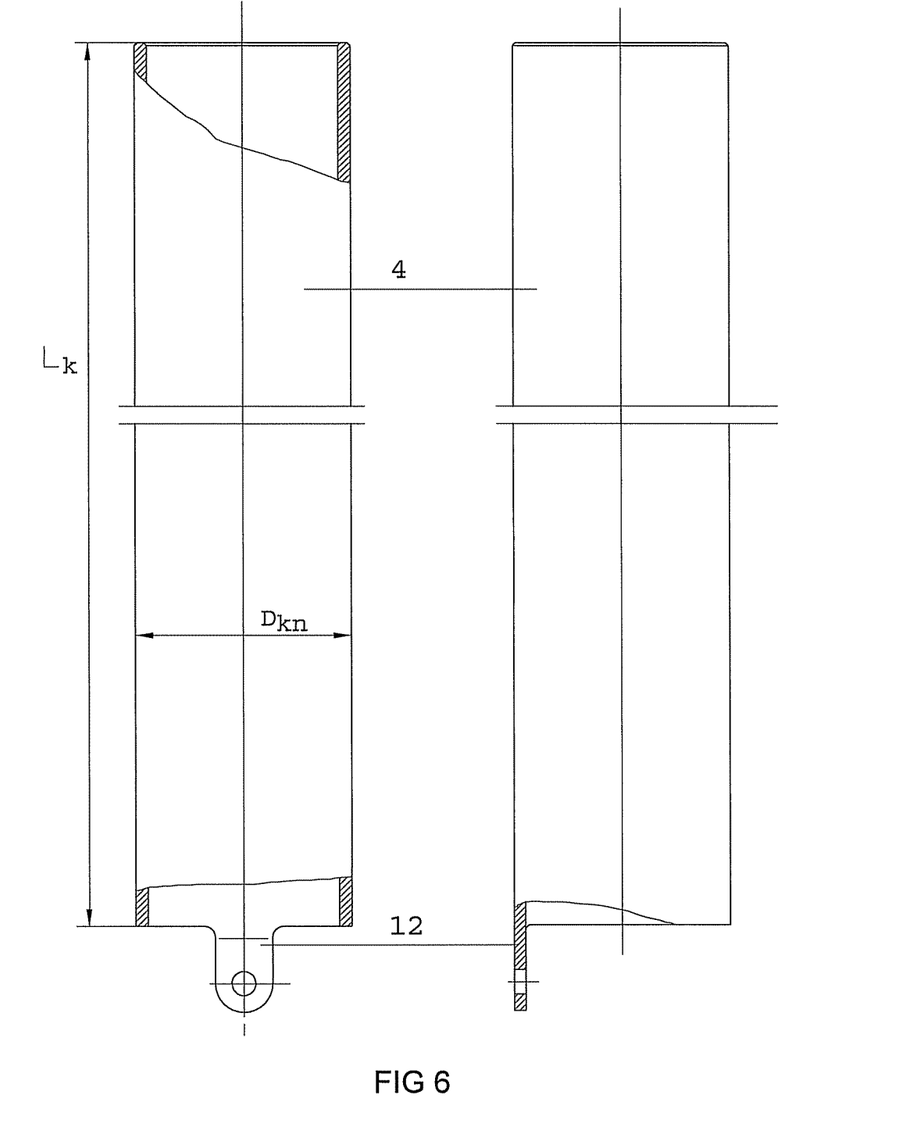
FIG. 6 is a drawing of an original cathode 4 with terminal 12, made integral with the cathode from the same tube stock.
Figure 7:
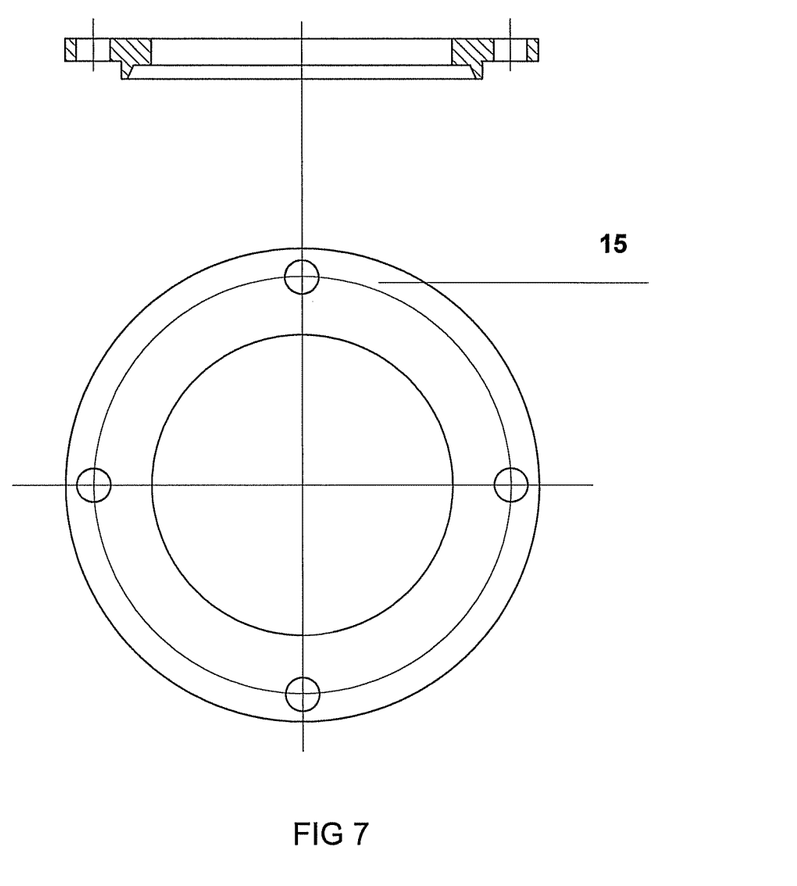
FIG. 7 illustrates an original flange 15, involved in the sealing of the cathode—cap joint.

The following features have been introduced in the design of the two-chamber coaxial electrolyser device: a tubular cathode (FIG. 6); a cathode current conductor 12 made as an integral part of the cathode from the same tube stock; and a welding seam 26 made along the whole perimeter of the anode's current conductor 13. The current conductors of the anode and cathode are located in predetermined places, which are optimal as regards their cooling by the introduced electrolytes—all this is meant to reduce the heating of the device and its components, i.e to provide dependable conditions for the work of the device at high currents and, consequently, to improve the production output of the electrolysis process.

Exemplary Embodiment

In order to optimise the technology used for the production of the device size range used to serve the apparatus with different outputs and to maintain optimal electrolysis process conditions in the devices, the relation between the part sizes in the same device complies with the following formula:

$$La + 30 \leq Ld \leq Lk - 30$$

and $$0.50 \leq \frac{Sa}{Sk} \leq 2.0 \leq, \text{ wherein}$$

La—length of anode, mm;
Ld—length of diaphragm, mm;
Lk—length of cathode, mm;
Sa—anode chamber cross-section area, $mm^2$;
Sk—cathode chamber cross-section area, $mm^2$.

At the same time, the absolute values of the part dimensions remain within the following limits:

| Part | Diameter, mm | Length, mm |
| --- | --- | --- |
| Cathode 4 | 18 ... 92 | 110 ... 350 |
| Diaphragm 6 | 22 ... 98 | 80 ... 320 |
| Anode 5 | 30 ... 102 | 50 ... 290 |

The two-chamber coaxial electrolyser device includes the cylindrical tubular anode 5 that has thread 29 and a chamfer 21 at each end for its connection with caps 2 and 3 by means of threads 29, and for sealing of the anode—cap joints with the use of standard O-rings 18 placed in grooves 28. This kind of design simplifies assembly of the device and increases its dependability as each joint between parts is checked individually during the assembly.

The anode 5 has a terminal 13, welded onto the outer cylindrical surface of the anode by weld seam 26, which continues along the whole perimeter of terminal 13 on anode 5, i.e the surface of electric contact is more extensive, the ohmic resistance and heating level are lower, which allows the device to operate at high currents improving the device's performance.

Chamfer 30 is made on the inner cylindrical surface at the ends of the anode 5 in order to diffuse the concentrated electric current at the cathode-facing edges and, thus, to raise the service life of the device.

The anode has protective coatings: the inner cylindrical surface is coated with a special compound that protects the anode's active part from the electrochemical corrosion, the outer cylindrical surface, being the outer casing of the device, is coated with a non-detachable water proofing and electric insulation coating 14 to protect the apparatus in case of the penetrating electrochemical damage of the anode's 5 active section.

The cathode 4 is made from a tube stock integral with terminal 12 and it is positioned in the device in such a way as to fix the part of the cathode 4 next to terminal 12 in the input cap 3 in order to cool down terminal 12 by the input flow of electrolyte. The cathode—cap joints are fixed and sealed through the compression in the stack and around the cathode of standard O-rings 16 with the use of original flange 15 and standard screws 19. Such special design and position of the cathode reduces the heating of terminal 12 and increases the device's production output, also simplifying the assembly of the device and increasing its dependability.

Putting the tubular cathode 4 in the position of the internal wall and the tubular anode 5 in the position of the outer wall of the device has improved the performance and dependability of the device through the relative reduction of the tubular electrode's weight as compared to a rod-type device. Further, the positioning of the tubular anode 5 also provides the additional possibility of increasing the device's dimensions as well as through the leak-tightness of the device, maintained with the use of the protective outer coating 14 of the anode and also through the relative reduction of the current density on the definitely greater area of the anode as compared to the smaller opposite area of the cathode.

The design of the cap 3 intended for input provides for the simplified arrangement of the helical movement of the electrolyte, because channels 20 and 24 introduce the electrolyte into the extensions 10 and 9 of the anode and cathode chambers, which allows replacement of the tangential positioning of the outer generating line of the input channels relative to the cylindrical surfaces of the anode 5 and diaphragm 6 with such positioning of input channels, when their longitudinal axes are displaced relative to the longitudinal axis of the device within the range that is not difficult to produce.

The design of the cap 2 intended for output provides for the reduction of the hydraulic friction during the outflow of the electrolysis products due to the fact that the longitudinal axes of the output channels 23 and 25 are displaced relative to the longitudinal axis of the device and positioned along the helical flow of the electrolysis products.

Figure 3:
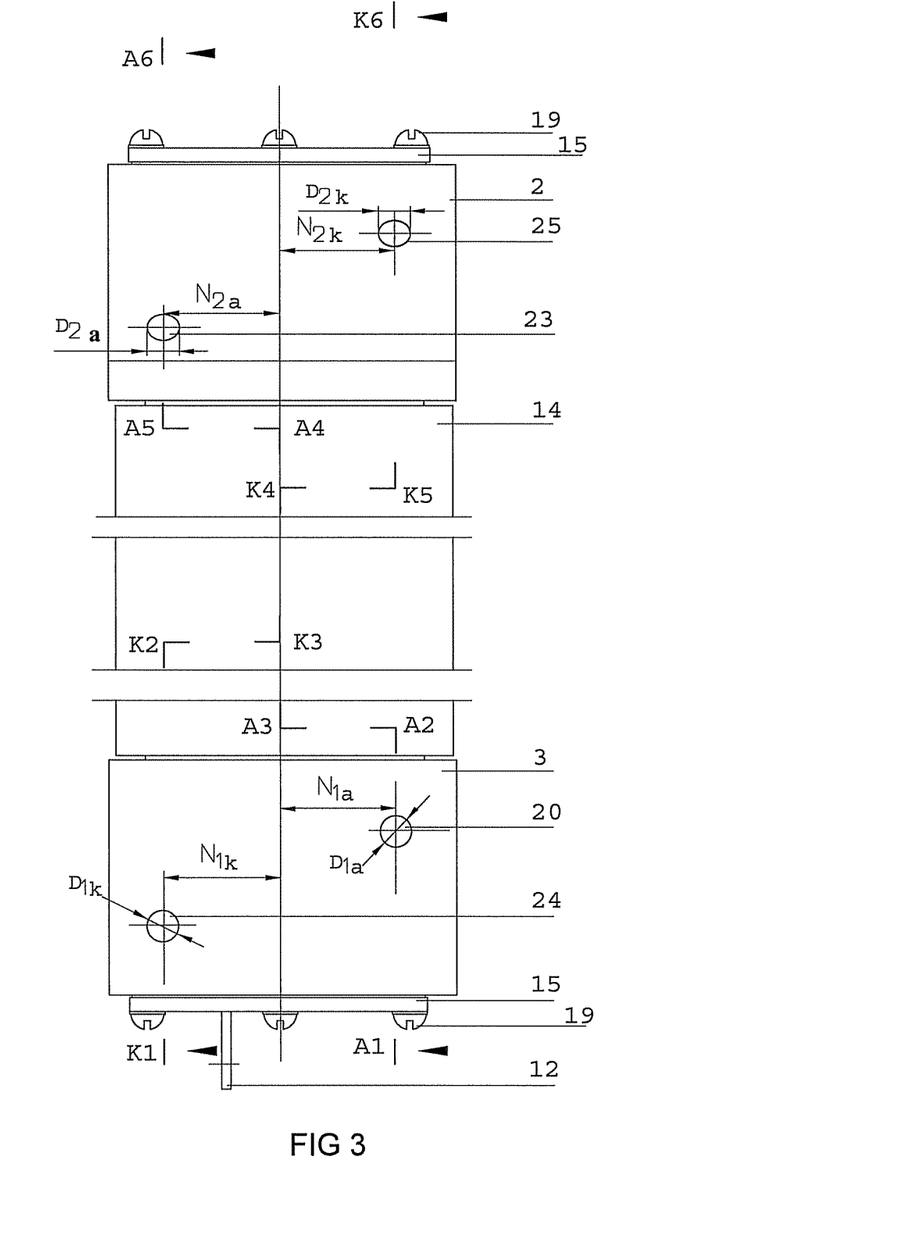
FIG. 3 is an assembly drawing of the two-chamber coaxial electrolyser device.

FIG. 3 shows the positions of channels 20, 23, 24 and 25 relative to each other, which provide for the helical movement of the electrolyte and reduction of the device's hydraulic friction.

Input channels 20—into the anode chamber, and 24—into the cathode chamber, are positioned in cap 3 with a displacement to opposite sides relative to the device's longitudinal axis. Output channels 23—from the anode chamber, and 25—from the cathode chamber, are positioned in cap 2 with a displacement to opposite sides relative to the device's longitudinal axis. Channel 20 for the input into the anode chamber in cap 3 and channel 23 for the output from the anode chamber in cap 2 are displaced to opposite sides relative to the device's longitudinal axis. Channel 24 for the input into the cathode chamber in cap 3 and channel 25 for the output from the cathode chamber in cap 2 are displaced to opposite sides relative to the device's longitudinal axis.

The distance $N_{1a}$ from the device's longitudinal axis to the longitudinal axis of the channel 20 for the input into the anode chamber 7 and the distance $N_{1c}$ from the device's longitudinal axis to the longitudinal axis of the channel 24 for the input into the cathode chamber 8 comply with the following formula:

$$0.5 D1a \leq N1a \leq 0.5(Dpa1 - D1a),$$

and $$0.5 D1k \leq N1k \leq 0.5(Dpk1 - D1k), \text{ wherein}$$

D1a—diameter of channel 20 for the input into anode chamber 7, mm;

Dpa1—diameter of extension 10 of anode chamber 7 in input cap 3, mm;

D1k—diameter of channel 24 for the input into cathode chamber 8, mm;

Dpk1—diameter of extension 9 of cathode chamber 8 in input cap 3, mm.

Distance N2a from the device's longitudinal axis to the longitudinal axis of the channel 23 for the output from the anode chamber 7 and the distance N2k from the device's longitudinal axis to the longitudinal axis of the channel 25 for the output from the cathode chamber 8 comply with the following formula:

$$0.5 D2a \leq N2a \leq 0.5(Dpa2 - D2a)$$

and $$0.5 D2k \leq N2k \leq 0.5(Dpk2 - D2k), \text{ wherein}$$

D2a—diameter of channel 23 for the output from anode chamber 7, mm;

Dpa2—diameter of extension 10 of anode chamber 7 in output cap 2, mm;

D2k—diameter of channel 25 for the output from cathode chamber 8, mm;

Dpk2—diameter of extension 9 of cathode chamber 8 in output cap 2, mm.

The introduction into the design of the caps 2 and 3 of the extensions 10 and 9 of the electrode chambers has made it possible to optimise the determination of the cross-section areas (diameters) of the input channels 20 and 24 and output channels 23 and 25 as well as their longitudinal axes' inclination in relation to the cap base plane irrespective of the size of clearance between the diaphragm and electrodes.

The optimal geometrical dimensions of caps 3 and 2 and their parts are as follows:

| Part | Diameter of channels, mm | Cap height, mm | Inclination of channel in relation to the base plane, deg |
|---|---|---|---|
| Cap 3 for input | 4 . . . 12 | 35 . . . 80 | 0 . . . 5 |
| Cap 2 for output | 6 . . . 24 | 40 . . . 100 | 0 . . . 45 |

The cylindrical extensions 10 of the anode chamber are situated between the outer cylindrical surface of the diaphragm and the cylindrical surfaces of the anode extensions in the caps, while lengthwise they are situated between the groove 28 for the O-ring 18 and the caps' internal diagonal wall 22, which separates the anode chamber 7 from the cathode chamber 8, while their geometrical dimensions comply with the following formula:

$(Ddn+2) \leq Dpa \leq Dav$, wherein

Ddn—diaphragm's outer diameter, mm;
Dpa—anode's extension diameter, mm;
Dav—anode's inner diameter, mm;

and $D1a \leq L1pa \leq D1a+4$, and $D2a \leq L2pa \leq D2a+24$, wherein

L1pa—length of the anode extension in the input cap, mm;
D1a—diameter of the channel for the input of electrolyte into the anode chamber, mm;
L2pa—length of the anode extension in the output cap, mm;
D2a—diameter of the channel for the output of electrolysis products from the anode chamber, mm.

The cylindrical extensions of the diaphragm are situated inside caps between the cap's internal diagonal wall 22 and the internal plane 27 with an opening for the cathode. The geometrical dimensions of the extensions comply with the following formula:

$(Dkn+2) \leq Dpk \leq (Ddn+2)$, wherein

Dkn—cathode's outer diameter, mm
Dpk—diaphragm extension diameter, mm
Ddn—diaphragm's outer diameter, mm and $D1k \leq L1pk \leq D1k+4$, and $D2k \leq L2pk \leq D2k+24$, wherein L1pk—length of the diaphragm extension in the input cap, mm;
D1k—diameter of the channel for the input of electrolyte into the cathode chamber, mm;
L2pk—length of the diaphragm extension in the output cap, mm;
D2k—diameter of the channel for the output of electrolysis products from the cathode chamber, mm.

The dependences between the diameters of the input and output channels comply with the following formula:

$D2k \geq D2a > D1k$, and $D1a \geq D1k$

The distance Lov from the centre of the output channel 24 to the internal diagonal wall 22 complies with the following formula:

$0.5 D2a \leq Lov \leq 0.5 D2a+3$, wherein

D2a—diameter of the channel for the output from the anode chamber, mm.

Figure 4:
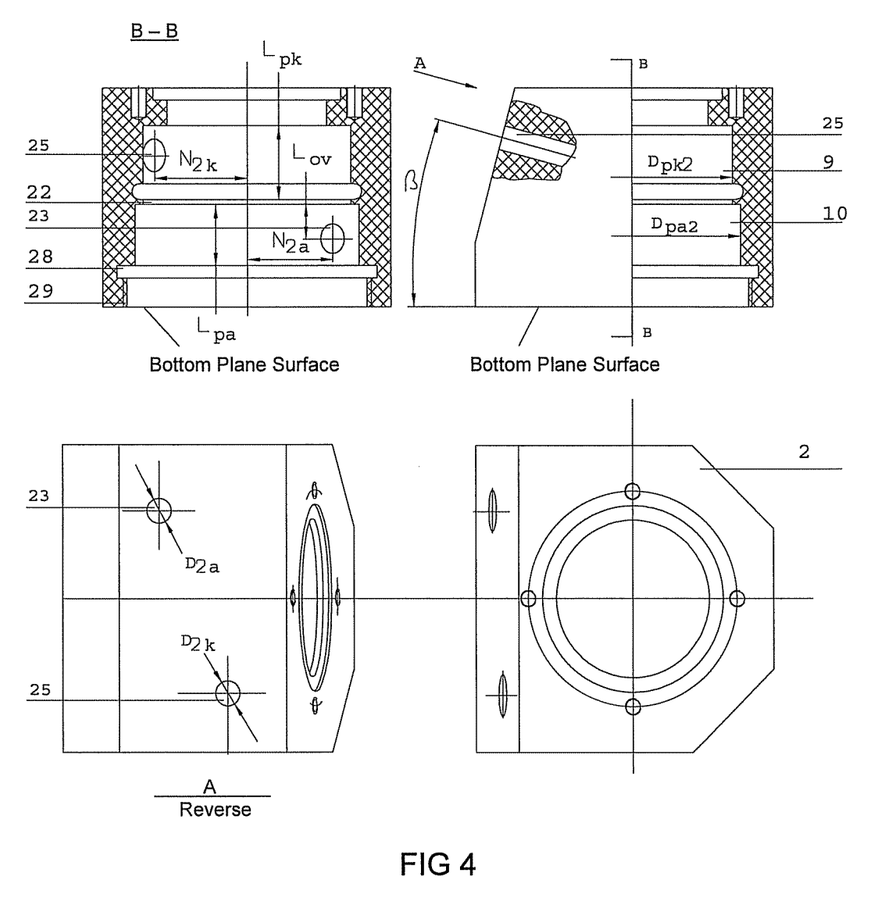
FIG. 4 illustrates a monolithic dielectric cap (for output) 2 with the indication of a passive extension 9 of the cathode chamber, passive extension 10 of the anode chamber, a diagonal wall 22, and output channels 25 from the cathode chamber and 23 from the anode chamber, as well as the dimensions and mutual position of the cap's structural elements.
Figure 5:
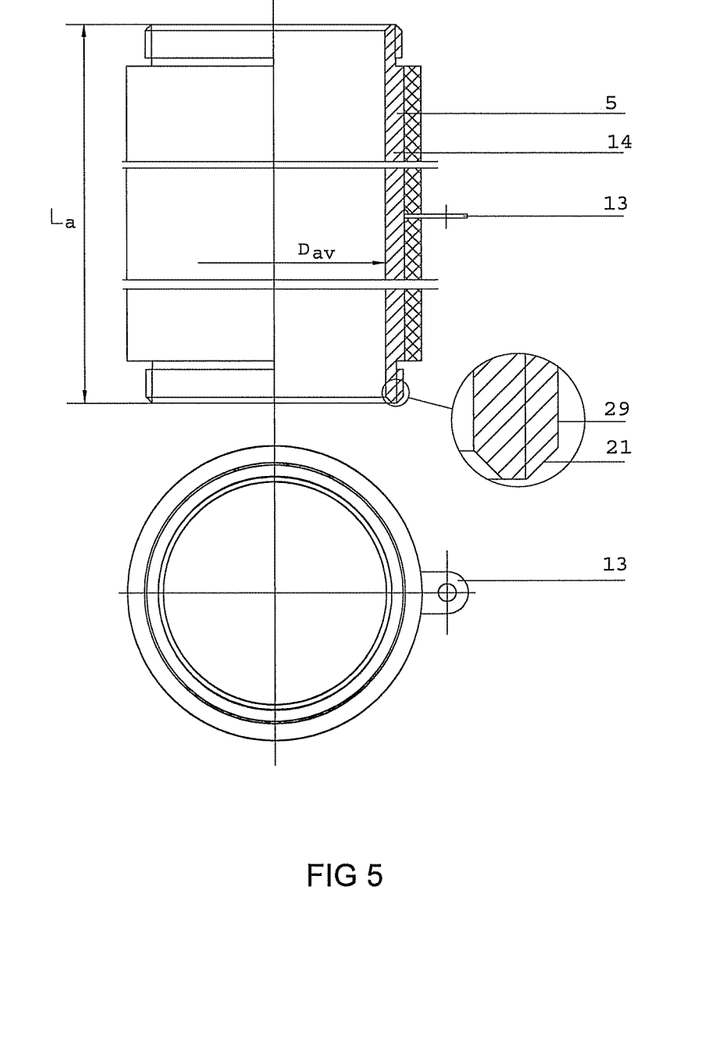
FIG. 5 illustrates an anode 5 with a terminal 13, welded by a welding seam 26, with thread 29 and a chamfer 21 for the sealing of the anode—cap joint, with an outer coating 14 for the protection of the apparatus from the device's electrochemical corrosion danger, with a chamfer 30 on the inner surface of the anode.

The passive extension 10 of the anode chamber in the monolithic dielectric cap 2 and the position of the channels 25 for the output from the anode chamber increase the device's dependability, because the interface between liquid and gaseous phases is transferred into the galvanically indestructible part of the anode chamber, i.e into its extension in the cap.

In order to simplify the technology of the production of caps 3 and 2, the longitudinal axes of channel 20 and channel 24 are positioned with the same angle $\alpha$ of the inclination to the base of cap 3, while the longitudinal axes of channel 23 and channel 25 are positioned with the same angle $\beta$ of the inclination to the base of cap 2.

In order to optimise the relation between the device's hydraulic friction and the electrolysis process effectiveness, the angle values $\alpha$ and $\beta$ are set within the following ranges:

$0° \leq \alpha < 5°$ $0° \leq \beta < 45°$

Figure 8:
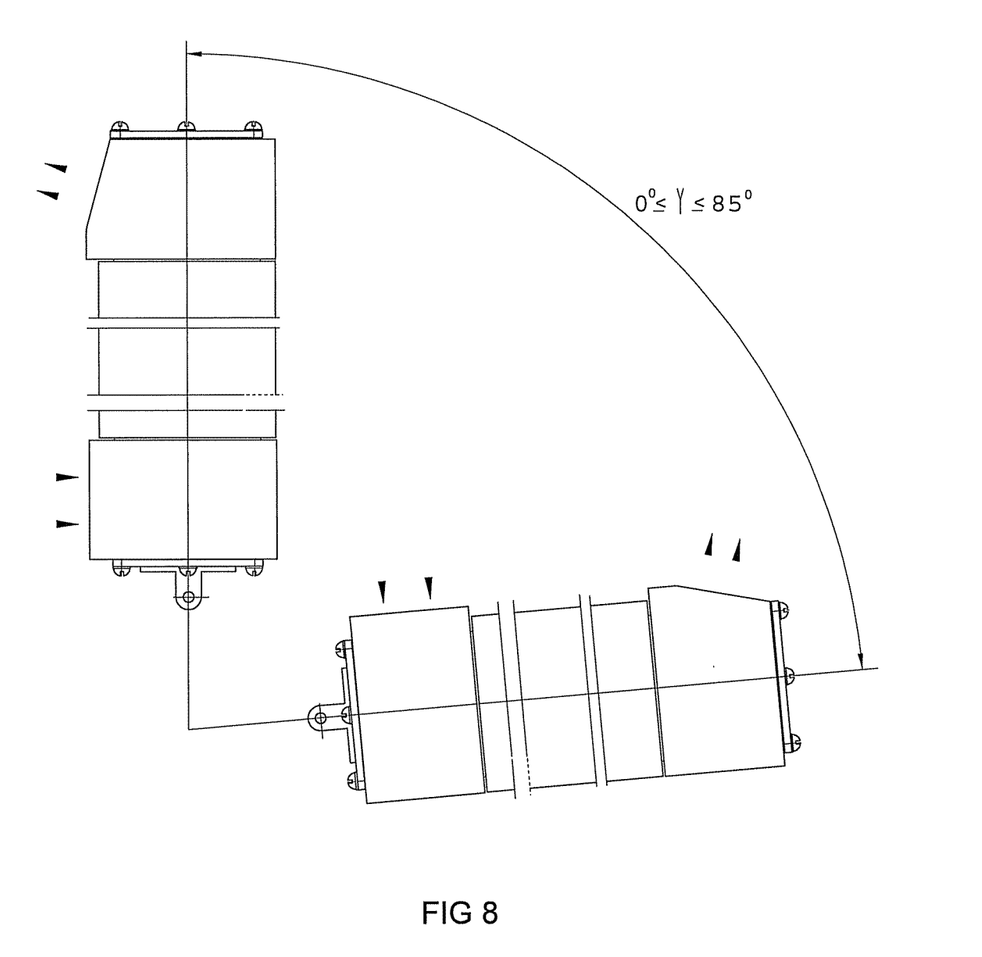
FIG. 8 contains the various options of the positioning of the device with respect to a vertical line, depending on its location in the apparatus or on the operating condition of the apparatus as a whole.

The combination of the device's structural features: the displacement of the longitudinal axes of channels 20 and 24 in relation to the device's longitudinal axis and the extensions 9 and 10 of electrode chambers, allow to position the device in the apparatus with the deviation of the longitudinal axis from the vertical line at a rate of up to 85° and operate the apparatus under pumping conditions.

The flow of electrolyte through the device is arranged as follows:

a) moving along the cylindrical channel 24, inclined in relation to the cap base plane with an angle of $\alpha$, the longitudinal axis of the channel being displaced relative to the device's longitudinal axis, the electrolyte enters the passive extension 9 of the cathode chamber 8 in the input cap 3 obtaining helical direction of movement; enters the cathode chamber 8 formed by the outer surface of the cathode 4 and the inner surface of the diaphragm 6, while the cathode chamber is separated from the anode one by the standard O-rings 17 in the caps 2 and 3; moves into the extension 9 of the cathode chamber in the output cap 2; along the cylindrical channel 25 for the output from the cathode chamber, while the longitudinal axis of the channel 25 is displaced relative to the device's longitudinal axis and inclined with an angle of $\beta$ in relation to the plane of the output cap 2 in accordance with the helical movement of the electrolyte; and b) moving along the cylindrical channel 20, the longitudinal axis of which is inclined with an angle of $\alpha$ in relation to the base plane of the input cap 3 and displaced relative to the device's longitudinal axis to the side opposite to the displacement of the axis of the channel 24, the electrolyte enters the passive extension 10 of the anode chamber obtaining the helical direction of movement; enters the anode chamber 7 formed by the inner cylindrical surface of the anode and the outer surface of the diaphragm; into the extension 10 of the anode chamber in the output cap 2; through the opening of the channel 23, positioned taking into account the phase interface displacement; along the channel 23, the longitudinal axis of which is displaced relative to the device's longitudinal axis and inclined with an angle of $\beta$ in relation to the plane of the output cap 2 in accordance with the helical movement of the electrolyte.

What is claimed is:

1. A two-chamber coaxial electrolyser device, consisting essentially of:
a cylindrical anode with a catalytic coating that is configured to protect the anode from electrochemical corrosion on an inner surface thereof that faces a cathode, wherein the anode includes an anode terminal and the cathode includes a cathode terminal, wherein the anode terminal and the cathode terminal are provided for connection of an electrical power source;
a diaphragm positioned between the anode and the cathode;
a first monolithic cap with an opening along a central axis of the device, wherein the first monolithic cap includes a first channel for input of electrolyte into an anodic chamber and a second channel for input of electrolyte into a cathodic chamber;
a second monolithic cap with an opening along the central axis of device with a third channel for output of products of electrolysis from the anodic chamber and a fourth channel for output of the products for electrolysis from cathodic chamber, with longitudinal axes of the first and second channels, as well as the longitudinal axes of the third and fourth channels for the output of the products of the electrolysis being parallel between themselves and located on different sides of a conditional plane drawn through the central axis of the device and parallel to the channels,
wherein the anode and the cathode are coaxially placed in the first and second monolithic caps such that the anode serves as an external electrode and the cathode serves as an internal electrode and the cathode goes through the openings of the monolithic caps, which have planes in the places of entrance and exit of the cathode, where the points of connections of the anode and cathode with the monolithic caps are sealed, areas for sealing rings being arranged in the monolithic caps in a way that is characterized by the sizes of the two-chamber coaxial electrolyzer device components which are limited by the following ranges: a diameter of the anode ranges from 30 mm to 102 mm with a length from 80 mm to 275 mm, a diameter of the cathode ranges from 22 mm to 86 mm, a diameter of the diaphragm range from 27 mm to 96 mm with a length ranging from 100 mm to 320 mm, wherein the anode includes threads at both edges thereof and a chamfer wherein the anode has a water proofing and electric insulation coating on an outer surface of the anode through the entire length of the anode between the first and second monolithic caps, wherein the monolithic caps include threads that cooperate with the threads of the anode to secure the anode,
wherein an annular coaxial flange is fastened to each monolithic cap by at least two screws, the flange having a downwardly and inwardly curved projecting lip portion, and the curved projecting lip forming a circular groove like recess for an O-ring, the curved projecting lip being positioned adjacent an outer surface of the cathode and the O-ring in the recess is between an U-formed inner surface of the curved projecting lip of the flange and the outer surface of the cathode; wherein a low edge of the third channel is placed higher than an edge of the anode, and
the longitudinal axes of the input channels in the first monolithic cap are located horizontally.

2. The device accordingly to claim 1, wherein the cathode is located so that a portion, which adjoins the cathode terminal for connection of the electrical power source, is located in the first monolithic cap with the first and second channels for input of electrolyte.

3. The device accordingly to claim 1, wherein the anode terminal is joined to the cylindrical surface of the anode by electric welding and a welding seam goes along a whole perimeter of a cross section of the terminal.

4. The device accordingly to claim 1 wherein the cathode is configured to have a tubular shape and is positioned as an inner cylinder within the anode.

5. The device accordingly to claim 1 wherein the terminal of the cathode is integrally formed as an extension of the cathode from the same tube stock as the cathode.

6. A two-chamber coaxial electrolyser device, consisting of:
a cylindrical anode with a catalytic coating that is configured to protect the anode from electrochemical corrosion on an inner surface thereof that faces a cathode, wherein the anode includes an anode terminal and the cathode includes a cathode terminal, wherein the anode terminal and the cathode terminal are provided for connection of an electrical power source;
a diaphragm positioned between the anode and the cathode;
a first monolithic cap with an opening along a central axis of the device, wherein the first monolithic cap includes a first channel for input of electrolyte into an anodic chamber and a second channel for input of electrolyte into a cathodic chamber;
a second monolithic cap with an opening along the central axis of device with a third channel for output of products of electrolysis from the anodic chamber and a fourth channel for output of the products for electrolysis from cathodic chamber, with longitudinal axes of the first and second channels, as well as the longitudinal axes of the third and fourth channels for the output of the products of the electrolysis being parallel between themselves and located on different sides of a conditional plane drawn through the central axis of the device and parallel to the channels,
wherein the anode and the cathode are coaxially placed in the first and second monolithic caps such that the anode serves as an external electrode and the cathode serves as an internal electrode and the cathode goes through the openings of the monolithic caps, which have planes in the places of entrance and exit of the cathode,
wherein sealing of the device consists of:
a) sealing of points of connections of the anode and cathode with the monolithic caps, where areas for sealing rings are arranged in the monolithic caps in a way that is characterized by the sizes of the two-chamber coaxial electrolyser device components which are limited by the following ranges: a diameter of the anode ranges from 30 mm to 102 mm with a length from 80 mm to 275 mm, a diameter of the cathode ranges from 22 mm to 86 mm, a diameter of the diaphragm ranges from 27 mm to 96 mm with a length ranging from 100 mm to 320 mm,
b) threads at both edges of the anode and a chamfer wherein the anode has a water proofing and electric insulation coating on an outer surface of the anode through the entire length of the anode between the first and the second monolithic caps, wherein the monolithic caps includes threads that cooperate with the threads of the anode to secure the anode, and
c) an annular coaxial flange that is fastened to each monolithic cap by at least two screws, the flange having a downwardly and inwardly curved projecting lip, and the curved projecting lip forming a circular groove like recess for an O-ring, the curved projecting lip being positioned adjacent an outer surface of the cathode and the O-ring in the recess being in between a U-formed inner surface of the curved projecting lip of the flange and the outer surface of the cathode;

wherein a low edge of the third channel is placed higher than the edge of the anode and the longitudinal axes of the input channels in the first input channels in the first monolithic cap are located horizontally.

* * * * *